US012234841B2

(12) United States Patent
Coors et al.

(10) Patent No.: US 12,234,841 B2
(45) Date of Patent: Feb. 25, 2025

(54) IONIC LIQUID ACCUMULATOR SYSTEM FOR DELIVERING GAS

(71) Applicant: Steelhead Composites, Inc., Golden, CO (US)

(72) Inventors: Andrew Coors, Littleton, CO (US); Alexis Dubois, Nederland, CO (US); Christian Fahrenbruck, Highlands Ranch, CO (US)

(73) Assignee: Steelhead Composites, Inc., Golden, CO (US)

( * ) Notice: Subject to any disclaimer, the term of this patent is extended or adjusted under 35 U.S.C. 154(b) by 0 days.

(21) Appl. No.: 18/484,349

(22) Filed: Oct. 10, 2023

(65) Prior Publication Data

US 2024/0125337 A1 Apr. 18, 2024

Related U.S. Application Data

(60) Provisional application No. 63/416,421, filed on Oct. 14, 2022.

(51) Int. Cl.
*F15B 1/04* (2006.01)

(52) U.S. Cl.
CPC .................................... *F15B 1/04* (2013.01)

(58) Field of Classification Search
CPC ............... F15B 1/08; F15B 1/04; F17C 5/007
See application file for complete search history.

(56) References Cited

U.S. PATENT DOCUMENTS

2010/0154924 A1* 6/2010 Casey ..................... F17C 5/007 222/3
2014/0102587 A1* 4/2014 Nagura ............. H01M 8/04208 141/69

* cited by examiner

*Primary Examiner* — Abiy Teka
(74) *Attorney, Agent, or Firm* — Don D. Cha; HDC Intellectual Property Law, LLP

(57) ABSTRACT

The present disclosure provides an accumulator system that utilizes an ionic liquid for pressurizing gases. In particular, the accumulator system of the present disclosure avoids use of any internal mechanical parts, e.g., a bladder or a piston, thereby eliminating any potential for mechanical failure experienced by conventional accumulators.

20 Claims, 3 Drawing Sheets

IONIC LIQUID ACCUMULATOR SYSTEM FOR DELIVERING GAS

CROSS-REFERENCE TO RELATED APPLICATIONS

This application claims the priority benefit of U.S. Provisional Application No. 63/416,421, filed Oct. 14, 2022, which is incorporated herein by reference in its entirety.

FIELD OF THE INVENTION

The present disclosure relates to an accumulator that utilizes ionic liquid for pressurizing gases. Such accumulator avoids use of any internal mechanical parts, e.g., a piston or a bladder, thereby eliminating any potential for mechanical failure experienced by conventional accumulators.

BACKGROUND OF THE INVENTION

An accumulator is a pressure vessel that are designed for many tasks, for example, in a hydraulic system. For example, accumulators are used to maintain pressure, store and recapture energy, reduce pressure peaks, power chassis suspensions, and dampen shock, vibration and pulsations.

With the rise in interest in using an alternative fuel source for transportation devices, such as automobiles, there has been a tremendous research and development in how to deliver fuel gas, such as hydrogen or liquid propane, to a storage tank of transportation devices. While some have been developing a system that utilizes an accumulator for fast gas fuel delivery system, such accumulators use a bladder, piston, or some other mechanical internal components to pressurize fuel gas for delivery. Unfortunately, as with any mechanically based system, these accumulators will eventually fail or leak, thereby requiring constant monitoring and maintenance programs.

Therefore, there is a need for an accumulator that can pressurize gas and charge the gas fuel or other gas storage tanks rapidly and without any potential for mechanical failure.

SUMMARY OF THE INVENTION

Some aspects of the disclosure are directed to an accumulator that does not have any internal mechanical moving parts, such as a piston or a bladder. By eliminating any internal mechanical parts, accumulators of the disclosure are virtually fail-safe, thus providing a substantially maintenance free accumulator system.

One particular aspect of the disclosure provides an ionic liquid-based accumulator system comprising:

(a) a high-pressure vessel (100) having a single internal compartment (102), a top surface (104A), and a bottom surface (104B), wherein said high-pressure vessel (100) comprises:

(i) a gas orifice (108) located at said top surface (104A) adapted to allow flow of gas to and from said single internal compartment (102); and (ii) a liquid orifice (112) located at said bottom surface (104B) adapted to allow flow of an ionic liquid to and from said single internal compartment (102);

(b) an ionic liquid holding vessel (200) operatively connected to said liquid orifice (112), wherein said ionic liquid holding vessel (200) comprises an ionic liquid; and (c) an ionic liquid pressurizing device (400) adapted to delivering an ionic liquid to said single internal compartment (102), thereby pressurizing said single internal compartment, wherein flow of the ionic liquid to and from said internal compartment (102) acts as a pressure accumulator.

In some embodiments, the ionic liquid-based accumulator system of the disclosure further comprises a gas vessel (300) that is operatively connected to said gas orifice (108) of said high-pressure vessel (100), wherein said gas vessel (300) comprises a gas that is immiscible with the ionic liquid.

Still in other embodiments, said liquid orifice (112) comprises a separate liquid inlet orifice (112A) and a liquid outlet orifice (112B). It should be appreciated that the liquid orifice can be a single orifice that is used as both inlet and outlet or it can have two separate orifices one for ionic liquid inlet and one for ionic liquid outlet. Use of the numeric legend 112 implies the liquid orifice can be a single orifice or two separate orifices. Use of labels "A" and "B" with numeric legend 112 indicates having more than one liquid orifice. In a similar manner, any other components, labeled with a numeric value in combination with an alphabet implies a separate element having a similar utility, for example, flow control valves 10 or 10A, 10B, 10C, . . . etc.

Yet in other embodiments, the ionic liquid-based accumulator system of the disclosure further comprises an ionic liquid delivery device (400) for transporting the ionic liquid in said ionic liquid holding vessel (200) to said high-pressure vessel (100) under pressure, thereby allowing the ionic liquid to act as a gas accumulator.

In further embodiments, said ionic liquid delivery device (400) comprises a hydraulic pump, diaphragm, reciprocating compressors, or a combination thereof.

In other embodiments, the ionic liquid-based accumulator system of the disclosure further comprises a gas drying device (30) that is located between said high-pressure vessel (100) and a high-pressure gas filling vessel (500).

Still yet in other embodiments, the ionic liquid comprises a phosphonium salt ionic liquid, an ammonium salt ionic liquid, a sulfonylimide salt ionic liquid, or a combination thereof.

Yet in further embodiments, the ionic liquid has a vapor pressure of about 0.1 mm Hg or less (0.05 mm Hg or less, and 0.025 mm Hg or less) at standard condition, e.g., 20° C. at 1 atm of pressure.

Another aspect of the invention provides an ionic liquid-based accumulator system comprising:

(a) a lightweight composite overwrapped high-pressure vessel (100) comprising:

(i) a fluid medium housing (102) comprising a plastic material, wherein said housing (102) comprises:

(1) a liquid orifice (112) adapted to allow flow of an ionic liquid to and from said housing, wherein said liquid orifice (112) is operatively connected to an externally located flow control system (600) that controls the flow of an ionic liquid to and from said housing (102); and (2) a gas orifice (108) for adapted to allow flow of a gas to and from said housing (102), wherein said gas orifice (108) is operatively connected to an externally located flow control system (600) that controls the flow of gas to and from said housing (102); and (ii) a composite overwrap material encasing said housing (102) and providing mechanical strength for said housing (102) under pressure;

(b) an ionic liquid holding vessel (200) operatively connected to a hydraulic device (400) that controls flow of the ionic liquid under pressure to said liquid orifice (112) of said housing (102), wherein a pressure created by flow of the ionic liquid to and from said housing (102) acts as an accumulator to control flow of the gas to and from said housing (102); and (c) a pneumatic device (10A) operatively connected to said gas orifice (108) of said fluid medium housing (102) for controlling flow of gas to and from said housing (102) to a high-pressure gas vessel (500).

In some embodiments, said hydraulic device (400) is a closed loop hydraulic system.

Yet in other embodiments, said liquid orifice (112) further comprises a first boss and a first valve attached to said first boss.

Still in other embodiments, said liquid orifice (112) comprises a separate liquid inlet orifice (112A) and a liquid outlet orifice (112B).

In further embodiments, said gas orifice (108) further comprises a second boss and a second valve attached to said second boss.

In other embodiments, the ionic liquid comprises a phosphonium salt ionic liquid, an ammonium salt ionic liquid, a sulfonylimide salt ionic liquid, or a combination thereof.

Still yet in other embodiments, the ionic liquid has a vapor pressure of about 0.1 mm Hg or less at standard condition.

Yet in further embodiments, the gas is hydrogen.

Still another aspect of the invention provides an accumulator system comprising:

(a) a high-pressure vessel (100) comprising:

(i) a single internal compartment (102);

(ii) a liquid orifice (112) adapted to allow flow of an ionic liquid to and from said single internal compartment (102), wherein said liquid orifice (112) is operatively connected to an externally located liquid flow control system (400) that controls the flow of an ionic liquid to and from said high pressure vessel (100); and (iii) a gas orifice (108) adapted to allow flow of a gas to and from said single internal compartment (102), wherein said gas orifice (108) is operatively connected to an externally located gas flow control system that controls the flow of gas to (10A) and from (10B) said high pressure vessel (100);

(b) an external hydraulic device (400) containing the ionic liquid and operatively connected to said liquid orifice (112) of said high pressure vessel (100) for controlling flow of the ionic liquid to and from said high pressure vessel (100); and (c) an external pneumatic device operatively connected to said gas orifice (108) of said high pressure vessel (100) for controlling flow of gas to and from said high pressure vessel (100).

While the high-pressure vessel can be any type of high-pressure vessel known to one of ordinary skill (e.g., Type 1, 2, 3, or 4), in one particular embodiment, the high-pressure vessel is a Type 3 or 4 pressure vessel. In some embodiments, the high-pressure vessel is a type 4 high-pressure vessel. Briefly, conventional categorization of high-pressure vessels is as follows:

Type 1 refers to a traditional all-metal high-pressure vessel often made of steel and used for storing liquid and gases for industrial processes.

Type 2 refers to a high-pressure vessel of type 1 that includes additional layer of carbon fiber or glass-fiber reinforcement, thereby allowing a thinner metal to be used. The carbon or glass fiber and the metal vessel share structural loads. Use of carbon or glass fiber provides added strength and reduces weight.

Type 3 refers to an aluminum or steel vessel high-pressure vessel that is overwrapped with a composite material, typically carbon fiber. The composite materials carry the bulk of the structural loads.

Type 4 refers to a high-pressure plastic or polymer vessel overwrapped with a composite material, typically carbon fiber or hybrid carbon/glass fiber composite material. Typically, the inner liner is made of polyamide or polyethylene plastic. Type 4 high-pressure vessels are much lower in weight and have a high mechanical strength. The composite materials carry substantially all of the structural loads.

In some embodiments, said liquid orifice of said high-pressure vessel further comprises a first boss and a first valve attached to said first boss.

Still in other embodiments, said gas orifice of said high-pressure vessel further comprises a second boss and a second valve attached to said second boss.

Yet in other embodiments, said liquid control system comprises a hydraulic pump, diaphragm, reciprocating compressors, or any other device or apparatus known to one skilled in the art.

In further embodiments, the ionic liquid comprises a phosphonium salt ionic liquid, an ammonium salt ionic liquid, a sulfonylimide salt ionic liquid, or a combination thereof. In general, any ionic liquid known to one of ordinary skill can be used in the accumulator system of the present disclosure. Exemplary ionic liquids that can be used in the present disclosure include, but are not limited to, lithium bis(trifluorosulfonyl)imide (LiTFSI); 1-ethyl-3-methylimidazolium triflate ([EMIM][$CF_3SO_3$]); 1-ethyl-3-methylimidazolium bis(trifluoromethylsulfonyl)imide ([EMIM][$Tf_2N$]); butyltrimethylammonium bis(trifluoromethylsulfonyl)imide ([N1114][$Tf_2N$]), as well as other ionic liquids having an anion such as tetrafluoroborate ($BF_4$), hexafluorophosphate ($PF_6$), bis-trifluoromethanesulfonimide ($NTf_2$), trifluoromethanesulfonate (OTf), dicyanamide ($N(CN)_2$), hydrogen sulphate ($HSO_4$), ethyl sulphate ($EtOSO_3$), etc. Other useful ionic liquids are disclosed, for example, in U.S. Patent Application Publication No. 2011/0073331, filed by Xu, which is incorporated by reference herein in its entirety.

In some embodiments, the ionic liquid used in accumulator system of the present disclosure has a vapor pressure of about 0.1 mm Hg or less, typically about 0.05 mm Hg or less, and often about 0.025 mm Hg or less) at standard condition, i.e., 20° C. at 1 atm pressure. When referring to a numerical value, the terms "about" and "approximately" are used interchangeably herein and refer to being within an acceptable error range for the particular value as determined by one of ordinary skill in the art. Such a value determination will depend at least in part on how the value is measured or determined, e.g., the limitations of the measurement system, i.e., the degree of precision required for a particular purpose. For example, the term "about" can mean within 1 or more than 1 standard deviation, per the practice in the art. Alternatively, the term "about" when referring to a numerical value can mean±20%, typically ±10%, often ±5% and more often ±1% of the numerical value. In general, however, where particular values are described in the application and claims, unless otherwise stated, the term "about" means within an acceptable error range for the particular value, typically within one standard deviation.

Still in other embodiments, the gas is hydrogen, propane, natural gas, or any other gases that are useful as a fuel source, as well as other gases (e.g., nitrogen, oxygen, carbon dioxide, helium, etc.) that are useful in various industries.

Another aspect of the disclosure provides an ionic liquid-based accumulator system comprising:

(a) a lightweight composite overwrapped high-pressure vessel comprising:
   (i) a fluid medium housing comprising a plastic material, wherein said housing comprises:
      (1) a liquid orifice adapted to allow flow of an ionic liquid to and from said housing, wherein said liquid orifice is operatively connected to an externally located liquid control system that controls the flow of an ionic liquid to and from said housing; and
      (2) a gas orifice for adapted to allow flow of a gas to and from said housing, wherein said gas orifice is operatively connected to an externally located gas flow control system that controls the flow of gas to and from said housing; and
   (ii) a composite overwrap material encasing said housing and providing mechanical strength for said housing under pressure;
(b) a hydraulic device comprising the ionic liquid and operatively connected to said liquid orifice of said housing for controlling flow of the ionic liquid to and from said housing, wherein a pressure created by the flow of ionic liquid to and from said housing provides flow control of the gas to and from said housing; and
(c) a pneumatic device operatively connected to said gas orifice of said accumulator housing for controlling flow of gas to and from said housing.

In some embodiments, said hydraulic device is a closed loop hydraulic system.

Still in other embodiments, said liquid orifice further comprises a first boss and a first valve attached to said first boss.

Yet in other embodiments, said gas orifice further comprises a second boss and a second valve attached to said second boss.

In further embodiments, the ionic liquid comprises those disclosed herein. Still in other embodiments, the ionic liquid has a vapor pressure of those disclosed herein.

In other embodiments, the gas is hydrogen, propane, or liquid natural gas.

A further aspect of the disclosure provides a method for using an ionic liquid as an accumulator in delivering a pressurized gas to a receiving vessel (500). The method includes:

(A) adding a gas to be delivered to a high-pressure vessel (100) having a single internal compartment (102), a top surface (104A), and a bottom surface (104B), wherein said high-pressure vessel (100) comprises:
   (a) a gas orifice (108) located at said top surface (104A) adapted to allow flow of the gas to and from said single internal compartment (102); and
   (ii) a liquid orifice (112) located at said bottom surface (104B) adapted to allow flow of an ionic liquid to and from said single internal compartment (102);
   (b) an ionic liquid holding vessel (200) operatively connected to said liquid orifice (112), wherein said ionic liquid holding vessel (200) comprises an ionic liquid; and
   (c) an ionic liquid pressurizing device (400) adapted to delivering an ionic liquid to said single internal compartment (102), thereby pressurizing said single internal compartment,
(B) adding an ionic liquid to said single internal compartment (102) to pressurize the gas within said single internal compartment (102); and
(C) delivering the pressurized gas to the receiving vessel (500) using the pressure generated within said single internal compartment (102) by the ionic liquid.

In some embodiments, the gas comprises hydrogen, propane, natural gas, nitrogen, oxygen, carbon dioxide, or helium. Still in other embodiments, the gas comprises hydrogen, propane, or natural gas.

Still in other embodiments, a solubility of the gas in the ionic liquid is about 1 g/L or less, typically about 0.5 g/L or less, often about 0.25 g/L or less, more often about 0.1 g/L or less, still more often about 0.01 g/L or less, and most often about 0.001 g/L or less.

DETAILED DESCRIPTION

Figure 1:
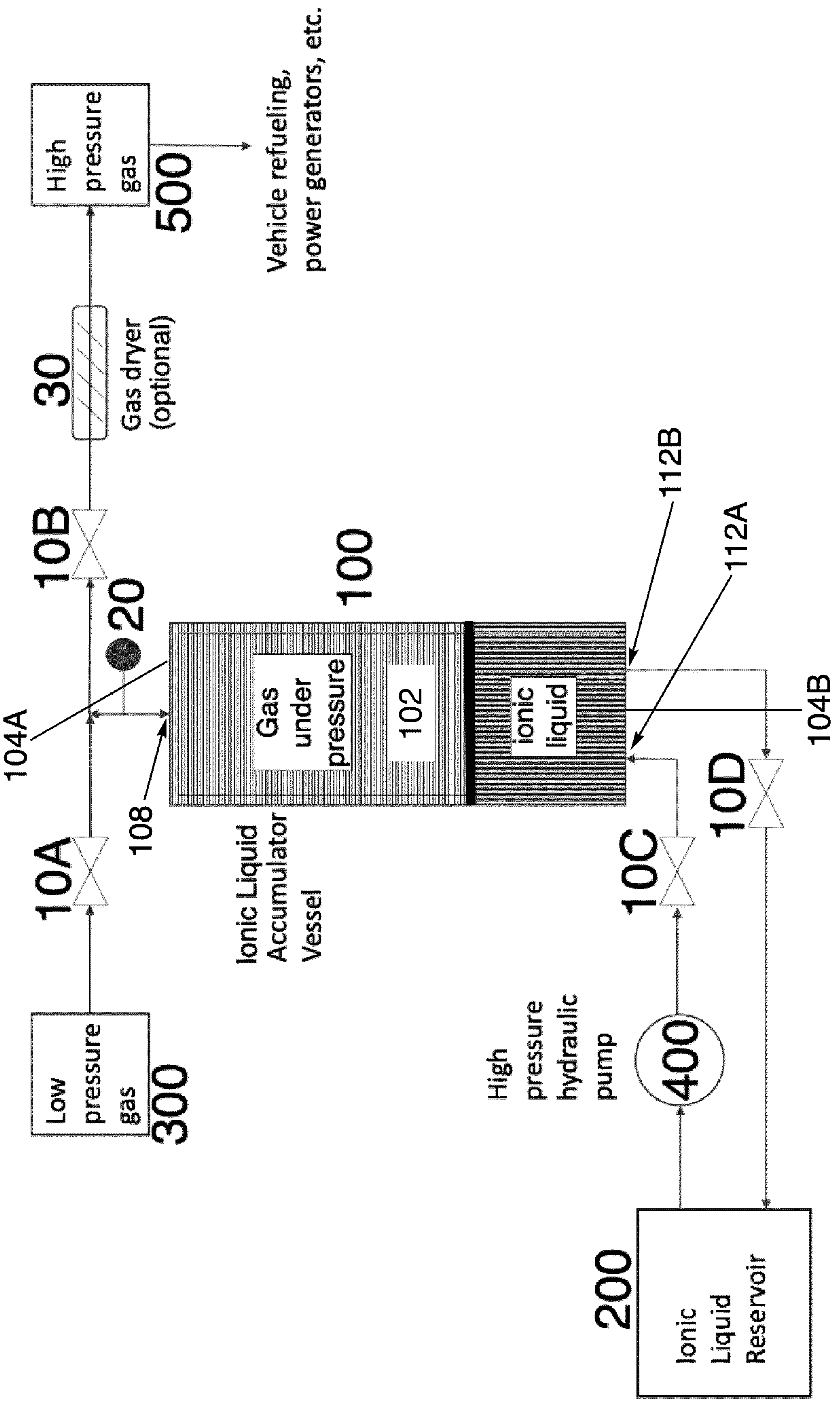
FIG. 1 is a schematic illustration of one particular embodiment of an accumulator system of the disclosure that can be used for vehicle refueling, power generators, etc.

The present disclosure will now be described with regard to the accompanying drawings, which assist in illustrating various features of the disclosure. In this regard, the present disclosure generally relates to an accumulator system that does not have any internal mechanical moving parts in an accumulator. That is, the disclosure relates to an accumulator system comprising an ionic liquid-based accumulator. In some embodiments, the accumulator includes a high-pressure vessel (100) comprising: (i) a single internal compartment (102); (ii) a liquid orifice (112) adapted to allow flow of an ionic liquid to and from said single internal compartment (102), wherein said liquid orifice (112) is operatively connected to an externally located liquid flow control system (400) that controls the flow of an ionic liquid to and from said high pressure vessel (100); and (iii) a gas orifice (108) adapted to allow flow of a gas to and from said single internal compartment (102), wherein said gas orifice (108) is operatively connected to an externally located gas flow control system (10A) that controls the flow of gas from the gas source (300) to said high pressure vessel (100).

Figure 2:
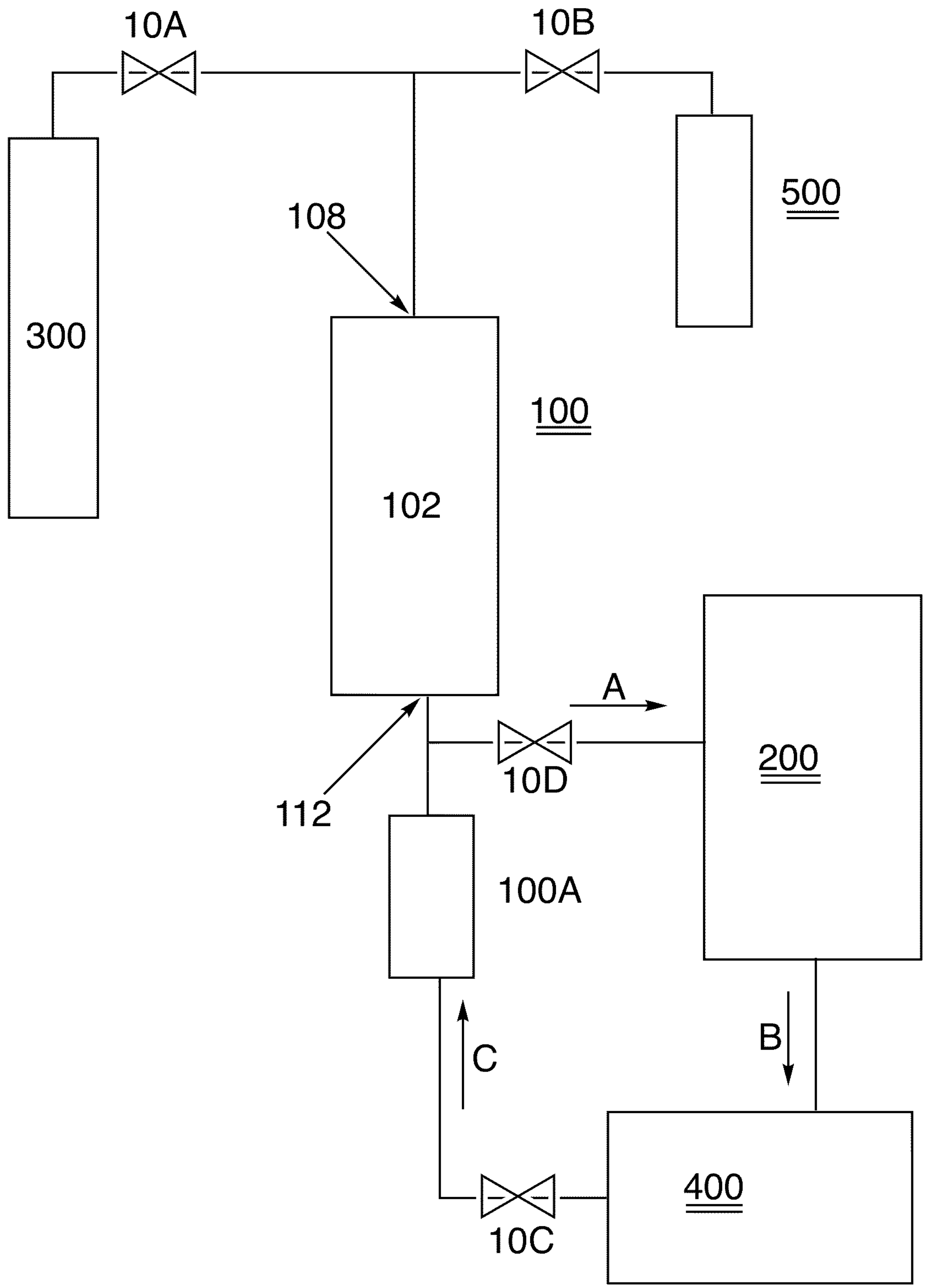
FIG. 2 is a schematic illustration of yet another embodiment of an accumulator system of the disclosure.
Figure 3:
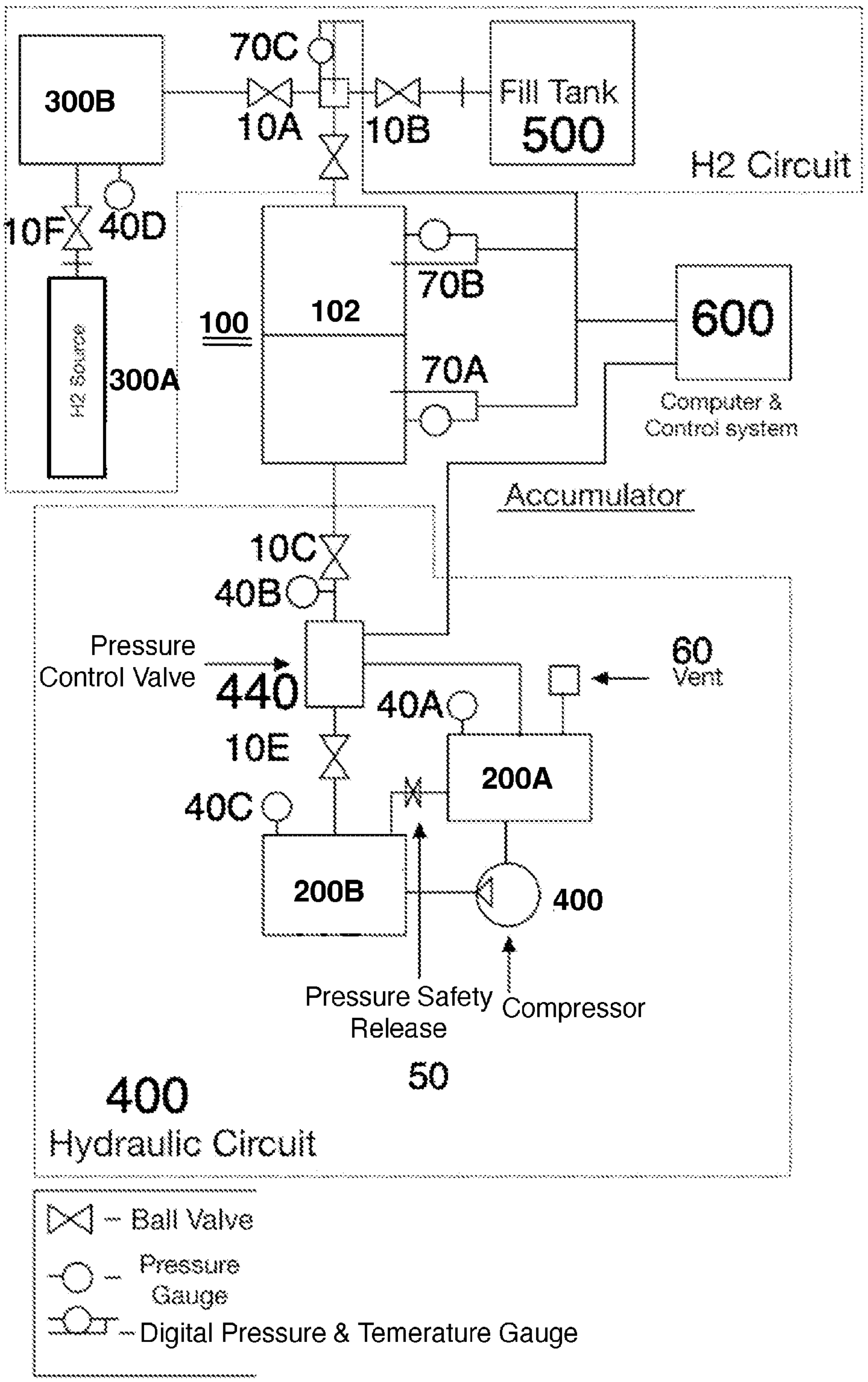
FIG. 3 is a schematic illustration of still another embodiment of an accumulator system showing inter-operational connections between (i) a gas refilling circuit, (ii) an accumulator of the disclosure including a hydraulic circuit, and (iii) a control system, e.g., a computer control system.

Three particular embodiments of ionic liquid-based accumulator systems are generally illustrated in FIGS. 1-3, which are provided solely for the purpose of illustrating the practice of the present invention and do not constitute any limitations on the scope of the present disclosure.

Referring to FIG. 1., the ionic liquid-based accumulator or a high-pressure tank (100) includes an ionic liquid holder (200) that is operatively connected to a hydraulic pump (400). The hydraulic pump (400) introduces ionic liquid to the ionic liquid-based accumulator (100). Unlike conventional accumulators that includes a bladder or a piston, the ionic liquid-based accumulator of the present disclosure does not have any bladder or piston that is located internally to the high-pressure vessel (100). In generally, the only materials present in the high-pressure vessel (100) of the disclosure is an ionic liquid that is introduced, e.g., by a hydraulic pump (400), and a gas that is introduced via a gas source (300). Briefly, in operation the high pressure vessel (100) is filled with a relatively low pressure gas from its source (300). The valve (10A) is then closed to prevent any back-flow of the gas to its source. Ionic liquid from its reservoir (200) is then pumped into the high pressure vessel (100) by, for example, a high pressure hydraulic pump (400) until a desired gas pressure is achieved within the high pressure vessel (100). When the gas flow control valve (10B) is opened, the pressurized gas within the high pressure vessel (100) is optionally passed through a gas dryer (30) to dry the gas prior to being filled or delivered to desired item, e.g., hydrogen gas vehicle, power generator, etc. The gas dryer (30) is optional and may be absent depending on the gas source (300). As the volume of pressurized gas decreases within the high pressure vessel (100), the hydraulic pump (400) fills the high pressure vessel (100) with the ionic liquid to maintain a relatively constant gas pressure. When the pressurized gas becomes unavailable, the control valve (10B) is closed along with the ionic-liquid control valve (10C), and the ionic liquid within the high pressure vessel (100) is allowed to circulate back to its reservoir (200) as the high pressure vessel (100) is refilled with the gas from the gas source (300).

It can be seen that using pressure, the high-pressure vessel (100) stores a volume of gas under high pressure by introducing an ionic liquid into the high pressure vessel (100). The ionic liquid is selected such that it does not dissolve any gas from the gas source (300). Typically, the gas from the gas source (300) has a solubility within the ionic liquid, which used as an accumulator, of about 1 g/L or less, typically about 0.5 g/L or less, often about 0.25 g/L or less, more often about 0.1 g/L or less, still more often about 0.01 g/L or less, and most often about 0.001 g/L or less. This results in compression or pressurization of gas by increasing the amount of ionic liquid introduced into the high-pressure vessel (100). As can be seen, there is no material within the internal chamber (102) of the high-pressure vessel (100). The ionic liquid that is introduced through the liquid orifice (112) acts as the accumulator by providing the pressure needed to compress the gas within the high-pressure vessel (100).

Because ionic liquids have a low vapor pressure, they are relatively non-volatile. Thus, the amount of pressure exerted by ionic liquid do not fluctuate drastically and is relatively constant. Furthermore, because the gas from the gas source (300) is relatively non-soluble in the ionic liquid used as the accumulator in the high-pressure vessel (100), the amount of pressure fluctuation due to the gas solubility is further reduced. In some embodiments, the ionic liquid has a vapor pressure of about 0.1 mm Hg or less, typically about 0.05 mm Hg or less, often about 0.025 mm Hg or less, more often about 0.01 mm Hg or less, and most often about 0.001 mm Hg or less at standard condition, e.g., at 20° C. at 1 atm of pressure.

FIG. 2 illustrates another embodiment of the ionic liquid-based accumulator system of the disclosure. In this embodiment, the gas supply tank (300) includes a gas flow control valve (10A). In addition, optional pressure gauge (not shown) can also be included to show the amount of gas present in the gas supply tank (300). The high-pressure vessel (100) is connected to the gas supply source (300) by a control valve (10A). The gas control valve (10A) can be directly attached to the gas supply tank (300) or it can be a separate device attached to a gas line. A temperature and/or pressure gauge (e.g., 40D in FIG. 3) may optionally be included within the line leading to the gas fill tank (500). The gas supply line leading to the gas fill tank (500) can also include a gas flow control valve (10B). Alternatively, the gas supply line can be connected directly to the gas flow control valve (10B). The gas fill tank (500) serves as a reservoir for storing a pressurized gas to allow instant or rapid filling of a vehicle, power generator, or other devices that utilize a pressurized gas.

In the embodiment illustrated in FIG. 2, the hydraulic pump (400) is located separately from the ionic liquid reservoir (200) and may optionally include a second high-pressure vessel or accumulator (100A). The second high-pressure vessel or accumulator (100A) can aid in flow of ionic liquid to and from the ionic liquid reservoir (200).

FIG. 3 illustrates another embodiment of the present disclosure. In this embodiment, the accumulator system of the disclosure is illustrated to contain three main parts or components: an accumulator circuit, a hydraulic circuit, and a gas circuit. In the accumulator circuit, a computer and/or a control system is used to operate various parts of the ionic liquid-based accumulator system. In particular, the control system (600) assesses various parameters within the high-pressure vessel or accumulator (100), hydraulic circuit, and the gas circuit to control the flow of ionic liquid to/from ionic liquid reservoir tanks (200A) and (200B). As shown in FIG. 3, the accumulator (100) has one or more pressure and/or temperature gauges (70A and 70B) that monitors the operation of the accumulator (100). As expected, if the temperature rises, the gas within the accumulator (100) expands creating higher pressure. Thus, an increase in temperature may cause a dangerously high pressurization of gas within the accumulator (100). The control system (600) monitors pressure and/or temperature to adjust the flow of either ionic liquid to/from the hydraulic circuit or the gas to/from the gas circuit to relieve any undesired pressure within the accumulator (100).

The hydraulic circuit can include a pressure safety release (50) and/or a vent (60) that can be used to control the pressure within the hydraulic circuit. In the embodiment illustrated in FIG. 3, there are two ionic liquid reservoirs (200A and 200B) each optionally having its own pressure gauges (40C and 40A, respectively). During pressurization, the control system (600) controls the pressure control valve (440) to control a flow of ionic liquid from the high-pressure tank (200B) into the accumulator (100) by, for example, opening the control valves 10E and 10C. The pressure of ionic liquid in high pressure tank (200B) is maintained by the compressor (400) that pumps ionic liquid in the reservoir (200A) into the high pressure ionic liquid tank (200B). The ionic liquid flow line can also include a pressure gauge (40B) to allow monitoring of the ionic liquid flow line pressure. This monitoring ensures safe operational pressurization of the hydraulic circuit. As the ionic liquid enters the accumulator (100), it pressurizes the gas within the accumulator (100). This pressurization is used to fill the tank (500) or any other device (e.g., vehicles, power generators, etc.) directly with gas. When the pressurized gas in the accumulator (100) has been depleted or a desired amount has been used, the control system (600) then returns the ionic liquid into the ionic liquid reservoir (200A). In general, the first ionic liquid reservoir (200A) is maintained at a lower pressure than the second or high pressure ionic liquid reservoir (200B).

Referring again to FIG. 3, the gas circuit includes a gas source (300A). This gas source (300A) can be a direct gas line from a gas supplier or it can be a separate replaceable gas tank. If the gas source (300A) is a direct gas line from a gas supplier, the gas circuit can optionally include a temporary gas storage device (300B) and a gas flow valve (10F). The gas storage device (300B) can optionally include a pressure gauge (40D) to monitor the amount of gas present in the gas storage device (300B). The gas flow into the accumulator (100) is controlled by the gas flow valve (10A). The gas line can optionally include a pressure and/or temperature gauge (70C), to ensure the gas line is being operated within the safe parameters. During operation, the pressurized gas within the accumulator (100) is then pumped into the fill tank (500) or the device directly via the gas control valve (10B).

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. An ionic liquid-based accumulator system comprising:

(a) a high-pressure vessel (100) having a single internal compartment (102), a top surface (104A), and a bottom surface (104B), wherein said high-pressure vessel (100) comprises:
  - (i) a gas orifice (108) located at said top surface (104A) adapted to allow flow of gas to and from said single internal compartment (102); and
  - (ii) a liquid orifice (112) located at said bottom surface (104B) adapted to allow flow of an ionic liquid to and from said single internal compartment (102);
  - (b) an ionic liquid holding vessel (200) operatively connected to said liquid orifice (112), wherein said ionic liquid holding vessel (200) comprises an ionic liquid;
  - (c) an ionic liquid pressurizing device (400) adapted to delivering an ionic liquid to said single internal compartment (102), thereby pressurizing said single internal compartment; and
  - (d) a high-pressure gas filling vessel (500) that is operatively connected to said high-pressure vessel (100), wherein said high-pressure gas filling vessel (500) is adapted for delivering or transporting a gas under high-pressure to a vehicle, container, or a vessel, wherein flow of the ionic liquid to and from said internal compartment (102) acts as a pressure accumulator.

2. The ionic liquid-based accumulator system of claim 1 further comprising a gas vessel (300) that is operatively connected to said gas orifice (108) of said high-pressure vessel (100), wherein said gas vessel (300) comprises a gas that is immiscible with the ionic liquid.

3. The ionic liquid-based accumulator system of claim 2, wherein said liquid orifice (112) comprises a separate liquid inlet orifice (112A) and a liquid outlet orifice (112B).

4. The ionic liquid-based accumulator system of claim 1, wherein said ionic liquid pressurizing device (400) transports the ionic liquid in said ionic liquid holding vessel (200) to said high-pressure vessel (100) under pressure, thereby allowing the ionic liquid to act as a gas accumulator.

5. The ionic liquid-based accumulator of claim 4, wherein said ionic liquid delivery device (400) comprises a hydraulic pump, diaphragm, reciprocating compressors, or a combination thereof.

6. The ionic liquid-based accumulator system of claim 1 further comprising a gas drying device (30) that is located between said high-pressure vessel (100) and said high-pressure gas filling vessel (500).

7. The ionic liquid-based accumulator system of claim 1, wherein the ionic liquid comprises a phosphonium salt ionic liquid, an ammonium salt ionic liquid, a sulfonylimide salt ionic liquid, or a combination thereof.

8. The ionic liquid-based accumulator system of claim 1, wherein the ionic liquid has a vapor pressure of about 0.1 mm Hg or less at standard condition.

9. An ionic liquid-based accumulator system comprising:

(a) a lightweight composite overwrapped high-pressure vessel (100) comprising:
  - (i) a fluid medium housing (102) comprising a plastic material, wherein said housing (102) comprises:
    - (1) a liquid orifice (112) adapted to allow flow of an ionic liquid to and from said housing, wherein said liquid orifice (112) is operatively connected to an externally located flow control system (600) that controls the flow of an ionic liquid to and from said housing (102); and
    - (2) a gas orifice (108) for adapted to allow flow of a gas to and from said housing (102), wherein said gas orifice (108) is operatively connected to an externally located flow control system (600) that controls the flow of gas to and from said housing (102); and
  - (ii) a composite overwrap material encasing said housing (102) and providing mechanical strength for said housing (102) under pressure;

(b) an ionic liquid holding vessel (200) operatively connected to a hydraulic device (400) that controls flow of the ionic liquid under pressure to said liquid orifice (112) of said housing (102), wherein a pressure created by flow of the ionic liquid to and from said housing (102) acts as an accumulator to control flow of the gas to and from said housing (102); and (c) a pneumatic device (10A) operatively connected to said gas orifice (108) of said fluid medium housing (102) for controlling flow of gas to and from said housing (102) to a high-pressure gas vessel (500).

10. The ionic liquid-based accumulator system of claim 9, wherein said hydraulic device (400) is a closed loop hydraulic system.

11. The ionic liquid-based accumulator system of claim 9, wherein said liquid orifice (112) further comprises a first boss and a first valve attached to said first boss.

12. The ionic liquid-based accumulator system of claim 9, wherein said liquid orifice (112) comprises a separate liquid inlet orifice (112A) and a liquid outlet orifice (112B).

13. The ionic liquid-based accumulator system of claim 9, wherein said gas orifice (108) further comprises a second boss and a second valve attached to said second boss.

14. The ionic liquid-based accumulator system of claim 9, wherein the ionic liquid comprises a phosphonium salt ionic liquid, an ammonium salt ionic liquid, a sulfonylimide salt ionic liquid, or a combination thereof.

15. The ionic liquid-based accumulator system of claim 9, wherein the ionic liquid has a vapor pressure of about 0.1 mm Hg or less at standard condition.

16. The ionic liquid-based accumulator system of claim 9, wherein the gas is hydrogen.

17. A method for using an ionic liquid as an accumulator in delivering a pressurized gas to a high-pressure gas filling vessel (500) to be stored therein, said method comprising:

(A) adding a gas to be delivered to a high-pressure vessel (100) having a single internal compartment (102), a top surface (104A), and a bottom surface (104B), wherein said high-pressure vessel (100) comprises:

(a) (i) a gas orifice (108) located at said top surface (104A) adapted to allow flow of the gas to and from said single internal compartment (102); and (ii) a liquid orifice (112) located at said bottom surface (104B) adapted to allow flow of an ionic liquid to and from said single internal compartment (102);

(b) an ionic liquid holding vessel (200) operatively connected to said liquid orifice (112), wherein said ionic liquid holding vessel (200) comprises an ionic liquid; and (c) an ionic liquid pressurizing device (400) adapted to delivering an ionic liquid to said single internal compartment (102), thereby pressurizing said single internal compartment, (B) adding an ionic liquid to said single internal compartment (102) to pressurize the gas within said single internal compartment (102); and (C) delivering the pressurized gas to the high-pressure gas filling vessel (500) using the pressure generated within said single internal compartment (102) by the ionic liquid and storing the pressurized gas in said high-pressure gas filling vessel (500).

18. The method of claim 17, wherein the gas comprises hydrogen, propane, natural gas, nitrogen, oxygen, carbon dioxide, or helium.

19. The method of claim 18, wherein the gas comprises hydrogen, propane, or natural gas.

20. The method of claim 17, wherein a solubility of the gas in the ionic liquid is about 1 g/L or less.

* * * * *